C. Richardson,
Game Board.
N°. 60,247.          Patented Dec. 4, 1866.
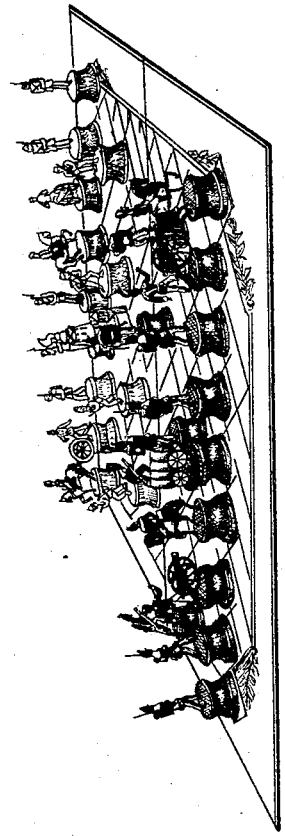
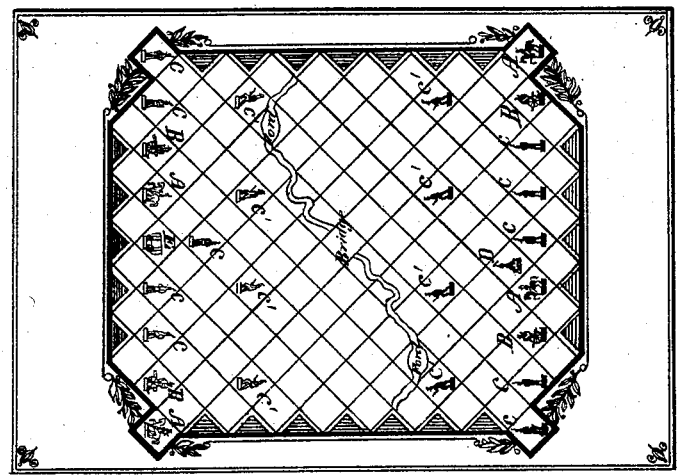
Witnesses.
A. J. Huggins.
A. S. Emmons
Inventor:
Charles Richardson

United States Patent Office.

GAME OF BATTLE: WAR CHESS.

CHARLES RICHARDSON, OF RICHMOND, VIRGINIA.

Letters Patent No. 60,247, dated December 4, 1866.

SPECIFICATION

TO ALL WHOM IT MAY CONCERN:

Be it known that I, CHARLES RICHARDSON, of Richmond, in the county of Henrico, in the State of Virginia, have invented a game styled War Chess, or the Game of Battle; and I do hereby declare that the following is a full and exact description thereof, reference being had to the accompanying photographs, and to the letters of reference marked on the latter.

The nature of my invention consists of the application of the strategy and tactics used in warfare to figures representing the several arms of the military service operating on a board. In the accompanying drawings—

Figure 1 represents the board on which the game is played, with the figures placed as at the beginning of the game.

Figure 2 is a photograph of the same.

A represents cavalry, B artillery, C infantry of the line, C' light infantry, D citadel or base of supplies, and E supply train. The board represents two antagonistic States separated by a river passable at three points (or a chain of mountains having three defiles that can be passed.)

To enable others to fully understand my game, I will proceed to describe its composition and operation.

The figures represent two antagonistic armies, one of which, the attacking (or invading) army is composed of four figures, each representing a regiment of light infantry; five figures, each representing a regiment of infantry of the line; two figures, each representing a regiment of cavalry; two figures, each representing a battery of artillery; and one figure (a wagon) representing the "supply train," in which it is to be supposed are carried all of the subsistence, ordnance stores, &c., necessary for the maintenance and effectiveness of the army. The object of the attacking army will be to capture the citadel.

The other army, called the defending army, is composed of four figures, each representing a regiment of light infantry; five figures, each representing a regiment of infantry of the line; two figures, each representing a regiment of cavalry; two figures, each representing a battery of artillery; and one figure, the citadel, representing a city in which are arms, ammunition, foundries, subsistence supplies, and all kinds of government property, which it is of vital importance to hold. The object, therefore, of the defending army, will be to secure the citadel against capture.

The board represents two open (comparatively level) States separated by a river, or chain of mountains, passable only at three points. The squares are arranged diagonally across the board in twenty rows, as follows: first row, six squares; second row, nine squares; third row, eight squares; fourth row, seven squares; fifth row, eight squares; sixth row, seven squares; seventh row, eight squares; eighth row, six squares; ninth row, seven squares; tenth row, seven squares; eleventh row, seven squares; twelfth row, six squares; thirteenth row, eight squares; fourteenth row, nine squares; fifteenth row, eight squares; sixteenth row, seven squares; seventeenth row, eight squares; eighteenth row, nine squares; nineteenth row, six squares.

Rules for Playing the Game.

Light infantry (see plate figure) moves one, two, or three squares, at the discretion of the player, directly forward, right or left obliquely, and one or two squares in any other direction, and can* take light infantry, infantry of the line, cavalry, and artillery.

Infantry of the line moves one or two squares in any direction, at the discretion of the player, and takes light infantry, infantry of the line, cavalry, and artillery.

Cavalry moves one, two, or three squares, at the discretion of the player, in any direction, and takes light infantry, infantry of the line, cavalry, and artillery.

Artillery moves one, two, or three squares, at the discretion of the player, diagonally, and can take artillery, but cannot take light infantry, infantry of the line, or cavalry, though it can check them; that is, neither of those figures can come within the range of the artillery, except when protected by artillery of its side; in which case light infantry, infantry of the line, cavalry, or artillery, can move on the first square next to the artillery of their side; but light infantry, infantry of the line, or cavalry, cannot occupy the second or third square; nor can either of the last-named figures occupy the first square next to the artillery of their side, if it is also the first square next to the artillery of the other side. Artillery can be placed there, but of course could be taken by the artillery of the other side. Artillery does not cover (or command) the second or third square from it when a figure intervenes.

When a piece of artillery bears on a figure of the other side that is not on the first square next to the artillery of its side, if cavalry, light infantry, or infantry of the line, it must move out of range of artillery.

Artillery cannot be moved leaving a figure of cavalry, light infantry, or infantry of the line of its side in range of artillery of the opposite side.

Artillery cannot take the citadel.

Artillery cannot take the wagon; but when a piece of artillery of the defending side is placed so as to bring the wagon within its range, if the attacking party cannot take that piece of artillery, then the wagon must be moved out of its range.

The wagon cannot occupy the second or third square from its artillery, if that square is in range of the artillery of the defending side; nor can it occupy the first square next to the artillery of its side, if it is also the first square next to the artillery of the defending side.

Should all of the figures of a side be taken except the artillery, that side loses the game, as artillery cannot take the citadel or wagon.

Light infantry, infantry of the line, or cavalry, can take the city or wagon.

The citadel cannot be checked or taken by artillery, and cannot check or take a figure; but the player (when it is his turn to move) may, once during a game, when the citadel is not in check by cavalry or infantry, move it at one move (at his option) to either one of the two corner squares on his side of the board, if that square is not occupied; but having been once moved, it must remain in the new position throughout the game; nor shall the player be permitted to return it to its original position.

The capture of the city or wagon will decide the game.

In commencing the game the figures are usually arranged as seen in the plate; but it is not necessary that they should be thus arranged in order to commence it: the game may be opened as well if the players determine a different order.

What I claim as my invention, and desire to secure by Letters Patent, is—

The board herein described and illustrated, in combination with movable figures representing cavalry, artillery, infantry, a supply train, and a citadel or base of supplies, substantially as shown and described, and for the purpose set forth.

CHARLES RICHARDSON.

Witnesses:
A. G. HUDGINS,
A. S. EMMONS.

---

\* When a piece is taken it is removed from the board, and the piece by which it is taken is placed on the square which was occupied by the captured piece.